US011965735B2

(12) United States Patent
Irie et al.

(10) Patent No.: US 11,965,735 B2
(45) Date of Patent: Apr. 23, 2024

(54) THICKNESS MEASUREMENT METHOD, THICKNESS MEASUREMENT DEVICE, DEFECT DETECTION METHOD, AND DEFECT DETECTION DEVICE

(71) Applicant: PANASONIC INTELLECTUAL PROPERTY MANAGEMENT CO., LTD., Osaka (JP)

(72) Inventors: Yousuke Irie, Nara (JP); Hirotsugu Inoue, Tokyo (JP); Koutaro Sakamoto, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 201 days.

(21) Appl. No.: 17/395,867

(22) Filed: Aug. 6, 2021

(65) Prior Publication Data

US 2021/0364282 A1 Nov. 25, 2021

Related U.S. Application Data

(63) Continuation of application No. PCT/JP2020/001048, filed on Jan. 15, 2020.

(30) Foreign Application Priority Data

Feb. 6, 2019 (JP) ................... 2019-019833

(51) Int. Cl.
*G01K 3/06* (2006.01)
*G01B 21/08* (2006.01)
(Continued)

(52) U.S. Cl.
CPC .......... *G01B 21/085* (2013.01); *G01J 5/0003* (2013.01); *G01N 25/72* (2013.01);
(Continued)

(58) Field of Classification Search
CPC . G01N 25/72; B66B 7/1215; B29L 2031/707; G01B 21/085; G01J 5/0003;
(Continued)

(56) References Cited

U.S. PATENT DOCUMENTS 5,085,073 A * 2/1992 Heyman ................... G01P 5/10
374/135
7,422,365 B2 * 9/2008 Chamberlain ......... G01N 25/72
374/2
(Continued)

FOREIGN PATENT DOCUMENTS

DE 287787 A5 * 3/1991
DE 10201202147 B3 * 1/2014
(Continued)

OTHER PUBLICATIONS

17395867_2023-11-28_DD_287787_A5_H.pdf,Mar. 1991.*
(Continued)

*Primary Examiner* — Gail Kaplan Verbitsky
(74) *Attorney, Agent, or Firm* — Rimon P.C.

(57) ABSTRACT

A thickness measurement method includes: heating a surface of the measurement object in a dot shape by a heating device; generating a thermal image corresponding to a temperature of the surface of the measurement object by capturing an image of the heated surface of the measurement object at a predetermined time interval by an imaging device; acquiring temperature data indicating temporal changes in temperature at multiple positions on the surface of the measurement object based on the thermal image generated by the imaging device; fitting a solution function indicating a solution of a heat conduction equation corresponding to a point heat source and including a parameter related to the thickness of the measurement object to the temperature data; and calculating the thickness of the mea-
(Continued)

surement object based on a value of the parameter in the fitted solution function.

11 Claims, 14 Drawing Sheets

(51) Int. Cl.
    *G01J 5/00* (2022.01)
    *G01N 25/72* (2006.01)
    *G01K 3/04* (2006.01)
(52) U.S. Cl.
    CPC ........ *G01J 2005/0077* (2013.01); *G01K 3/04* (2013.01); *G01K 3/06* (2013.01)
(58) Field of Classification Search
    CPC ...... G01J 2005/0077; G01J 5/00; G01K 3/04; G01K 3/06
    See application file for complete search history.

(56) References Cited

U.S. PATENT DOCUMENTS

| | | | |
|---|---|---|---|
| 7,909,507 B2* | 3/2011 | Bunker | G01K 17/20 374/45 |
| 8,506,159 B2* | 8/2013 | Nakagawa | G01N 25/72 250/340 |
| 2007/0103470 A1* | 5/2007 | Han | G06T 13/80 345/473 |
| 2008/0144049 A1* | 6/2008 | Ringermacher | G01N 25/72 356/630 |
| 2008/0291465 A1 | 11/2008 | Lorraine et al. | |
| 2013/0148689 A1* | 6/2013 | Yahaba | G01N 25/72 374/5 |
| 2015/0092814 A1* | 4/2015 | Wolfgruber | G01N 25/72 374/121 |
| 2015/0260667 A1 | 9/2015 | Isakov et al. | |
| 2016/0033431 A1* | 2/2016 | Hatori | G01N 25/00 374/43 |
| 2018/0372487 A1 | 12/2018 | Irie et al. | |
| 2023/0133257 A1* | 5/2023 | Michini | H02S 50/10 374/4 |

FOREIGN PATENT DOCUMENTS

| | | | | |
|---|---|---|---|---|
| DE | 102014218136 A1 | * | 3/2016 | ........... G01B 21/085 |
| JP | H03189547 A | * | 8/1991 | |
| JP | H04-331360 A | | 11/1992 | |
| JP | 2003504011 A | * | 2/2003 | |
| JP | 2005283548 A | * | 10/2005 | |
| JP | 2006-125933 A | | 5/2006 | |
| JP | 2011-122859 A | | 6/2011 | |
| JP | 2011185852 A | * | 9/2011 | |
| KR | 19980033317 A | * | 7/1998 | |
| WO | WO-2005005972 A1 | * | 1/2005 | ............. G01N 25/72 |
| WO | WO-2008116069 A1 | * | 9/2008 | ............. G01K 11/32 |
| WO | 2017/130251 A1 | | 8/2017 | |

OTHER PUBLICATIONS

17395867_2023-11-28_JP_2011185852_A_H.pdf,Sep. 2011.*
17395867_2023-11-28_DE_102014218136_A1_H.pdf,Mar. 2016.*
K. Brugger, "Exact Solutions for the Temperature Rise in a Laser-Heated Slab," Journal of Applied Physics, vol. 43, No. 2, pp. 577-583, Feb. 1972.
International Search Report and Written Opinion issued in International Patent Application No. PCT/JP2020/001048, dated Mar. 31, 2020; with partial English translation.
Notice of Reasons for Refusal dated Jul. 5, 2022 issued in the corresponding Japanese Patent Application No. 2020-571056, with English translation.
Extended European Search Report dated Jan. 28, 2022 issued in the corresponding European Patent Application No. 20751917.4.
English translation of the International Preliminary Report on Patentability issued in International Application No. PCT/JP2020/001048, dated Aug. 19, 2021.
Chinese Office Action dated Feb. 7, 2024 issued in Chinese Patent Application No. 202080012629.1, with English machine translation.

* cited by examiner

THICKNESS MEASUREMENT METHOD, THICKNESS MEASUREMENT DEVICE, DEFECT DETECTION METHOD, AND DEFECT DETECTION DEVICE

CROSS-REFERENCE OF RELATED APPLICATIONS

This application is the U.S. Continuation of International Patent Application No. PCT/JP2020/001048, filed on Jan. 15, 2020, which in turn claims the benefit of Japanese Application No. 2019-019833, filed on Feb. 6, 2019, the entire disclosures of which Applications are incorporated by reference herein.

TECHNICAL FIELD

The present disclosure relates to a method and a device for measuring a thickness of a measurement object, and a method and a device for detecting a defect of an inspection object.

BACKGROUND ART

JP 2011-122859 A discloses a defect diagnosis method (defect detection method) enabling measurement of a depth from a surface of a defect such as a separation or a cavity in a structure (inspection object) by using an infrared thermography method. The infrared thermography method is a method of detecting a depth of a defect by an infrared camera (imaging device) capturing a change in surface temperature caused by interruption of thermal migration due to a thermal insulation property of the defect such as a separation or a cavity inside a structure. The infrared thermography method requires heating or cooling of a structure for causing thermal migration inside the structure. Methods of heating/cooling include an active method using a heating device such as a heater or a lamp and a passive method using solar radiation or natural air cooling.

The defect diagnosis method (defect detection method) of measuring a defect depth inside a structure (inspection object) is applicable to a thickness measurement method of measuring a thickness of a measurement object.

SUMMARY

The present disclosure provides a thickness measurement method and a thickness measurement device capable of accurately measuring a thickness of a measurement object. The present disclosure also provides a defect detection method and a defect detection device capable of accurately detecting a defect depth of an inspection object.

A thickness measurement method according to an aspect of the present disclosure is a method of measuring a thickness of a measurement object. The thickness measurement method comprises: heating a surface of the measurement object in a dot shape by a heating device; generating a thermal image corresponding to a temperature of the surface of the measurement object by capturing an image of the heated surface of the measurement object at a predetermined time interval by an imaging device; acquiring temperature data indicating temporal changes in temperature at multiple positions on the surface of the measurement object based on the thermal image generated by the imaging device; fitting a solution function indicating a solution of a heat conduction equation corresponding to a point heat source and including a parameter related to the thickness of the measurement object to the temperature data; and calculating the thickness of the measurement object based on a value of the parameter included in the fitted solution function.

A thickness measurement device according to an aspect of the present disclosure is a device measuring a thickness of a measurement object. The thickness measurement device comprises: an input interface inputting a thermal image generated by capturing an image of a heated surface of the measurement object at a predetermined time interval; and a processor performing a calculation for obtaining a thickness of the measurement object based on the thermal image. The processor acquires temperature data indicating temporal changes in temperature at multiple positions on the surface of the measurement object based on the thermal image, fits a solution function indicating a solution of a heat conduction equation corresponding to a point heat source and including a parameter related to the thickness of the measurement object to the temperature data, and calculates the thickness of the measurement object based on a value of the parameter included in the fitted solution function.

A defect detection method according to an aspect of the present disclosure is a method of measuring a depth of a defect inside an inspection object. The defect detection method comprises: heating a surface of the inspection object in a dot shape by a heating device; generating a thermal image corresponding to a temperature of the surface of the inspection object by capturing an image of the heated surface of the inspection object at a predetermined time interval by an imaging device; acquiring temperature data indicating temporal changes in temperature at multiple positions on the surface of the inspection object based on the thermal image; fitting a solution function indicating a solution of a heat conduction equation corresponding to a point heat source and including a parameter related to the depth of the defect of the inspection object to the temperature data; and calculating the depth of the defect of the inspection object based on a value of the parameter included in the fitted solution function.

The defect detection device according to an aspect of the present disclosure is a device measuring a depth of a defect inside an inspection object. The defect detection device comprises: an input interface inputting a thermal image generated by capturing an image of a heated surface of the inspection object at a predetermined time interval; and a processor performing a calculation for obtaining the depth of the defect of the inspection object based on the thermal image. The processor acquires temperature data indicating temporal changes in temperature at multiple positions on the surface of the inspection object based on the thermal image, fits a solution function indicating a solution of a heat conduction equation corresponding to a point heat source and including a parameter related to the depth of the defect of the inspection object to the temperature data, and calculates the depth of the defect of the inspection object based on a value of the parameter included in the fitted solution function.

With the thickness measurement method and device in the present disclosure, the thickness of the measurement object can accurately be measured. The defect detection method and device in the present disclosure are used for measuring a defect such as a separation or a cavity inside an inspection object so that the defect can accurately be measured.

DESCRIPTION OF EMBODIMENTS

Embodiments will now be described in detail with reference to the drawings as needed. It should be noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art. The accompanying drawings and the following description are provided by the present inventor for sufficient understanding of this disclosure by those skilled in the art, and it is not intended to limit the subject matter described in claims thereto.

First Embodiment

A defect detection system of a first embodiment will hereinafter be described with reference to the drawings.

[1-1. Configuration]

[1-1-1. Defect Detection System]

Figure 1:
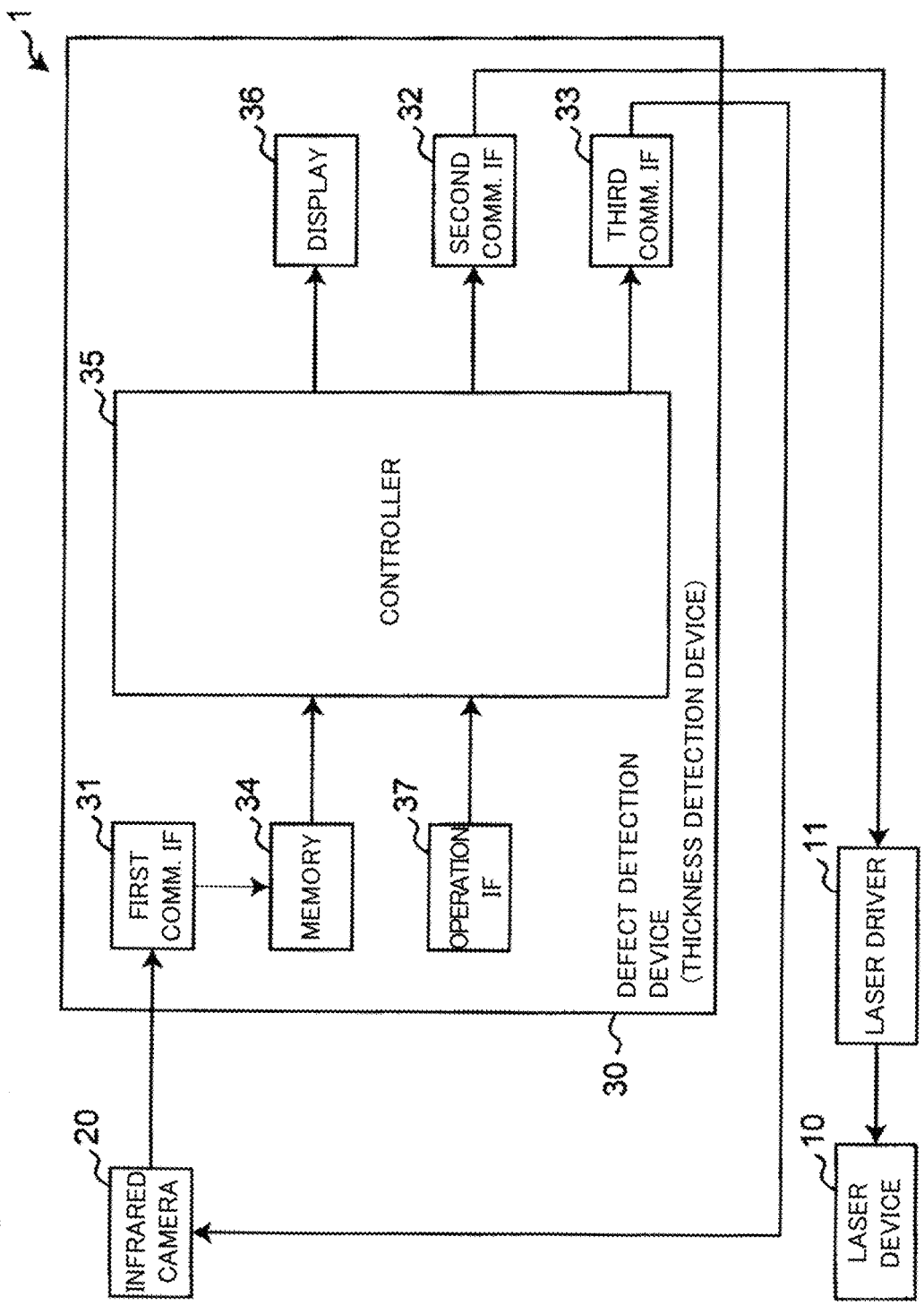
FIG. 1 is a diagram showing a configuration of a defect detection system and a defect detection device according to a first embodiment.

FIG. 1 is a diagram showing a configuration of a defect detection system 1 according to the first embodiment. As shown in FIG. 1, the defect detection system 1 measures a depth of a defect such as a separation or a cavity inside an inspection object, thereby performing defect detection. The defect detection system 1 includes a laser device 10, a laser driver 11, an infrared camera 20, and a defect detection device 30.

The laser device 10 is an example of a heating device applying a laser beam to heat a surface of an inspection object. The laser device 10 includes a laser light source such as a shutter LD for starting and stopping a heating output, and an optical system collimating (or condensing) the laser light to a predetermined laser diameter and emitting the laser light. The laser diameter is appropriately set to a size such that a portion irradiated with the laser beam can be regarded as a dot in practical use, and the size may be several cm or less, for example. The laser device 10 may have a simple configuration such as a laser pointer, for example.

The laser driver 11 is a device driving the laser device 10. The laser driver 11 controls the start and stop of the heating output of the laser device 10 under the control of a controller 35 of the defect detection device 30. Therefore, the laser driver 11 controls opening and closing of the shutter of the laser device 10. The laser driver 11 may control the start and stop of the heating output of the laser device 10 through starting and stopping a power supply to the laser device 10. The laser driver 11 may include an actuator or the like for adjusting the position, direction or the like of the laser beam applied by the laser device 10.

The infrared camera 20 is an imaging device capturing an image of a surface of an inspection object. The infrared camera 20 has multiple pixels and generates thermal image data corresponding to the temperature of the surface of the inspection object at a predetermined frame rate.

The defect detection device 30 controls the laser driver 11 to control the start and stop of the heating output of the laser drive 10. The defect detection device 30 controls an image-capturing operation of the infrared camera 20. The defect detection device 30 measures a depth of a defect inside the inspection object based on the thermal image data from the infrared camera 20, thereby performing defect detection. A configuration of the defect detection device 30 will hereinafter be described.

[1-1-2. Defect Detection Device]

The defect detection device 30 is a computer, for example. As shown in FIG. 1, the defect detection device 30 includes first to third communication interfaces 31, 32, 33, a memory 34, the controller 35, a display 36, and an operation interface 37.

The first to third communication interfaces 31, 32, 33 are each a communication interface (e.g., USB, HDMI (registered trademark)), for example. The first communication interface 31 is an input interface sequentially receiving from the infrared camera 20 the thermal image data captured at a predetermined frame rate.

The second communication interface 32 receives lamp control information related to a heating start, a heating stop or the like of the laser device 10 from the controller 35 and transmits the information to the laser driver 11. The third communication interface 33 receives camera control information related to an image-capturing start, an image-capturing end or the like of the infrared camera 20 from the controller 35 and transmits the information to the infrared camera 20.

The memory 34 is a recording medium and includes an HDD or an SSD, for example. The memory 34 sequentially stores the thermal image data received by the first communication interface 31. The memory 34 stores various setting values input from the operation interface 37 described later, the setting values being necessary for measuring the depth of the defect of the inspection object. The memory 34 also stores various programs for the controller 35.

The controller 35 includes a CPU, an MPU or the like and executes various programs stored in the memory 34 to control the entire defect detection device 30. The controller 35 controls the laser driver 11 to control the start and stop of the heating output of the laser device 10. The controller 35 controls the image-capturing operation of the infrared camera 20 such as start and stop of image-capturing. The controller 35 functions as a processor performing calculations for obtaining the depth of the defect of the inspection object, based on the thermal image data stored in the memory 34. Details of this function will be described in description of operation described later.

The display 36 is a display, for example, and displays the depth of the defect obtained by the controller 35 as color information or gradation information, for example.

The operation interface 37 includes a keyboard or a touch panel, for example. The operation interface 37 is a device operated by a user when setting various setting values necessary for measuring the depth of the defect of the inspection object.

[1-2. Operation]

The operation of the defect detection system 1 and the defect detection device 30 configured as described above will hereinafter be described.

[1-2-1. Overview of Defect Detection]

When a surface of an inspection object such as concrete constituting a road surface is heated, heat conduction occurs from the surface (high temperature side) of the inspection object to the inside (low temperature side). In this case, when a defect such as a separation or a cavity exists inside the inspection object, the heat conduction is prevented by the defect so that thermal reflection occurs. As a result, a surface temperature becomes higher in a defective portion having the defect existing therein as compared to a surface temperature of a sound portion having no defect existing therein. This temperature difference on the surface is utilized for detecting a defect in a known method.

For example, a technique is proposed that the image of the surface of the inspection object is captured while being heated with a halogen lamp or the like, and the defect depth in the defective portion of the inspection object is obtained based on information obtained from a heat conduction equation related to the inspection object being heated (see WO 2017/130251). In this technique, a theory of one-dimensional heat conduction corresponding to the depth direction of the inspection object is applied by heating a wide area including a region in which temperature is to be measured on the surface of the inspection object. In this case, if the thermal diffusivity of the inspection object is known, the defect depth (or the thickness of the inspection object) can be obtained by using the known thermal diffusivity for a theoretical solution of a one-dimensional heat conduction equation.

However, for example, the thermal diffusivity of concrete takes a value in a wide range of approximately 1.0 to $2.0 \times 10^{-6}$ m$^2$/s and may vary depending on various influences such as a condition of water content and a bias of aggregate. Therefore, it is anticipated that the thermal diffusivity is not known before the defect detection is performed. In the prior art, it is difficult to accurately measure the defect depth when the thermal diffusivity of the inspection object is unknown.

To address this, the present disclosure provides a defect detection method in which the thermal diffusivity and the defect depth of the inspection object are simultaneously obtained. According to this method, the defect depth can be measured even when the thermal diffusivity of the inspection object is unknown, and the detection accuracy of the defect depth can be improved.

In the defect detection method of the present disclosure, the surface of the inspection object is heated in a dot shape by a heating device such as the laser device 10 of the defect detection system 1, and the image of the surface temperature of the inspection object is captured by the infrared camera 20 or the like during heating to generate a thermal image corresponding to the surface temperature of the inspection object. The defect detection method of the present disclosure uses, for the defect detection, the temperature data based on this thermal image and theoretical equations for two-dimensional heat conduction occurring around a point heat source on the surface due to heating (equations (1) to (4) described later).

[1-2-2. Theory of Defect Detection]

A theoretical equation of temperature change obtained from the heat conduction equation (i.e., the theoretical solution of the same equation) used in the defect detection method and the defect detection system 1 of the present disclosure will hereinafter be described with reference to FIGS. 2 to 4.

Figure 2:
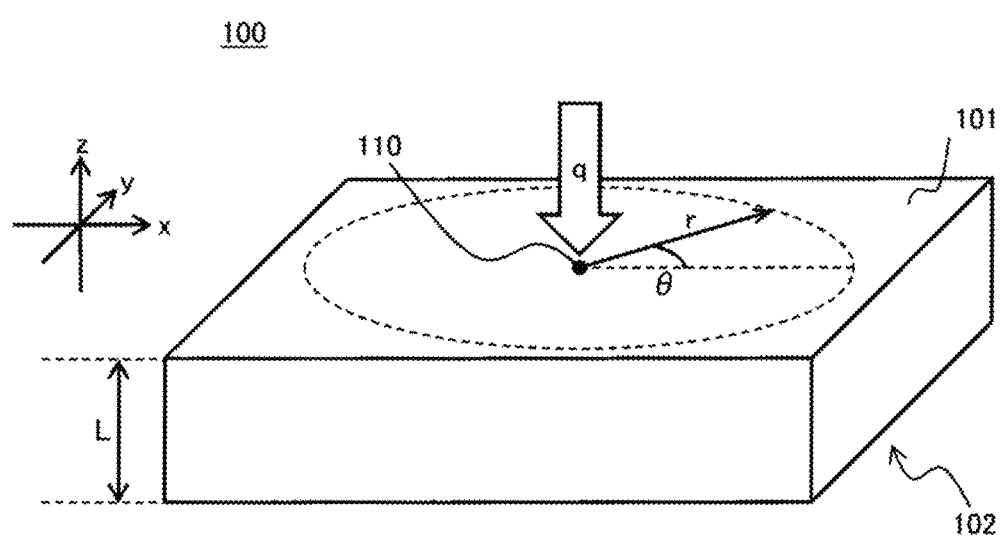
FIG. 2 is a diagram for explaining an inspection object and a point heat source in the theory of the defect detection system.

FIG. 2 is a diagram for explaining an inspection object 100 and a point heat source 110 in the theory of the system 1. In FIG. 2, the inspection object 100 is theoretically assumed as a flat plate having infinite front surface 101 and back surface 102. It can be assumed that the point heat source 110 corresponding to the heating by the system 1 is located on the front surface 101 of the inspection object 100. Such a theoretical assumption can appropriately be applied with an allowable error at the time of actual measurement.

The inspection object 100 as described above is assumed to have a thickness of L corresponding to a defect depth. For example, the position of the point heat source 110 is defined as the origin to use two-dimensional orthogonal coordinates (x, y) on the front surface 101 of the inspection object 100 and three-dimensional coordinates (x, y, z) using the z coordinate indicating the thickness direction of the inspection object 100. Polar coordinates (r, θ) can be used instead of the two-dimensional orthogonal coordinates (x, y) (provided that x=r×cos θ, y=r×sin θ). At the three-dimensional coordinates (x, y, z), an unsteady heat conduction equation is expressed as Eq. (10).

[Mathematical 1] (10)

$$\left(\frac{\partial}{\partial t} - \alpha\left(\frac{\partial^2}{\partial x^2} + \frac{\partial^2}{\partial y^2} + \frac{\partial^2}{\partial z^2}\right)\right)T(x, y, z, t) = \frac{Q(x, y, z, t)}{\rho c}$$

In Eq. (10), Q(x, y, z, t) is a heat quantity [W/m³] generated per unit time and per unit volume at a certain position and time t at the three-dimensional coordinates (x, y, z) is shown. Additionally, a is the thermal diffusivity [m²/s] of the inspection object 100, and α=k/ρc is satisfied. Additionally, k is the thermal conductivity [W/(m·K)] of the inspection object 100, p is the density [kg/m³] of the inspection object 100, and c is the specific heat [J/(kg·K)], and pc is the volume specific heat [J/(m³·K)] of the inspection object 100.

In this system 1, Q(x, y, z, t) in Eq. (10) corresponds to the point heat source 110. FIG. 3 is a graph showing a state of heating by the system 1. In FIG. 3, the horizontal axis indicates the time t corresponding to a heating time [s], and the vertical axis indicates the heat quantity [W] (=[J/s]) per unit time in the vicinity of the position (z=0) of the point heat source 110 on the front surface 101. In the system 1, as shown in FIG. 3, it is assumed that heating is performed in a step shape in which a constant heat quantity q [W] is supplied from the time t=0 at the start of heating. At z≠0 away from the point heat source 110, Q(x, y, z, t)=0 is satisfied regardless of the time t. Before the start of heating, Q(x, y, z, t)=0 is satisfied regardless of the z coordinate.

Figure 4:
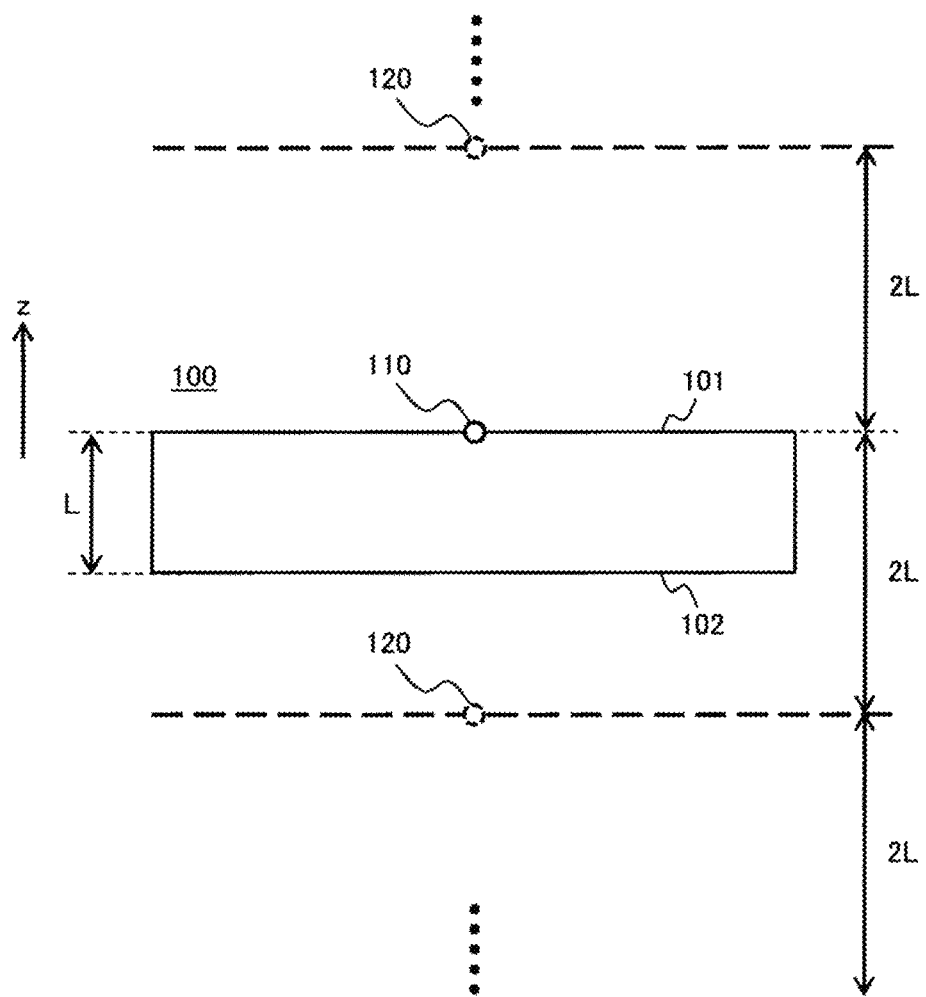
FIG. 4 is a diagram for explaining boundary conditions of heat conduction in the inspection object of FIG. 2.

FIG. 4 is a diagram for explaining boundary conditions of heat conduction in the inspection object 100 of FIG. 2. A mirror image method, which uses the front surface 101 and the back surface 102 of the inspection object 100 as mirror surfaces, can be applied to the boundary conditions causing heat reflection in the inspection object 100. In this case, since the front surface 101 and the back surface 102 face each other at an interval of a thickness L, a multiplicity of mirror images 120 of the point heat source 110 on the front surface 101 is lined up in periods 2L in the thickness direction (z direction), as shown in FIG. 4.

For example, by applying the mirror image method to the Green's function of the heat conduction equation, T(x, y, z, t) can be obtained as the theoretical solution of Eq. (10) so that the boundary conditions are satisfied (see K. Brugger, "Exact Solutions for the Temperature Rise in a Laser-Heated Slab", Journal of Applied Physics, vol. 43, no. 2, pp. 577-583, February 1972). For example, when the theoretical solution T(x, y, z, t) is on the front surface 101, T(x, y, z=0, t)=T(r, t) is represented by Eq. (11).

[Mathematical 2] (11)

$$T(r, t) = \frac{q}{2\pi k}\sum_{n=-\infty}^{\infty} \frac{1}{\sqrt{r^2 + 4n^2L^2}}\exp\left(\frac{r^2 + 4n^2L^2}{4\alpha t}\right)$$

In Eq. (11), exp ( ) is an exponential function and n is the circular constant. Σ takes the sum of the integer n from the negative infinity to the positive infinity, and constitutes the infinite sum.

T(r, t) is an example of a solution function indicating the solution of the heat conduction equation (Eq. (10)) according to the point heat source 110, and represents the (incremental) temperature at the time t based on the heating start at a distance r from the point heat source 110 on the front surface 101. T(r, t) includes the infinite sum of the period 2L as shown in Eq. (11) in accordance with the heat reflection in the inspection object 100.

For example, T(r, t) of Eq. (11) can be made dimensionless as shown in Eq. (1) below by a Fourier number Fo using initial values $\alpha_0$, $L_0$ (see Eq. (12)) and a dimensionless distance $r/L_0$ (hereinafter, "$r/L_0$" may be abbreviated as "r/L").

[Mathematical 3] (12)

$$F_0 = \frac{L_0^2}{\alpha_0 t}$$

[Mathematical 4] (1)

$$T(r, t) = A\sum_{n=-\infty}^{\infty} \frac{1}{\sqrt{\left(\frac{r}{L_0}\right)^2 + 4n^2B^2}}\exp\left(\frac{1}{2}\sqrt{CF_o}\sqrt{\left(\frac{r}{L_0}\right)^2 + 4n^2B^2}\right)$$

$$A = \frac{q}{2\pi k L_0} \quad (2)$$

$$B = \frac{L}{L_0} \quad (3)$$

$$C = \frac{\alpha_0}{\alpha} \quad (4)$$

In Eq. (1), the arguments r, t of T(r, t) on the left side correspond to dimensionless two variates r/L, Fo on the right side, respectively. The right side includes three parameters A, B, C based on Eqs. (2), (3), (4). The defect detection system 1 of this embodiment uses Eqs. (1) to (4) to perform fitting of three variable with two variates in the defect detection device 30 for measured temperature data.

[1-2-2. Defect Detection Operation]

A defect detection operation by the controller 35 of the defect detection device 30 according to the first embodiment will hereinafter be described with reference to a flowchart of FIG. 5.

Figure 5:
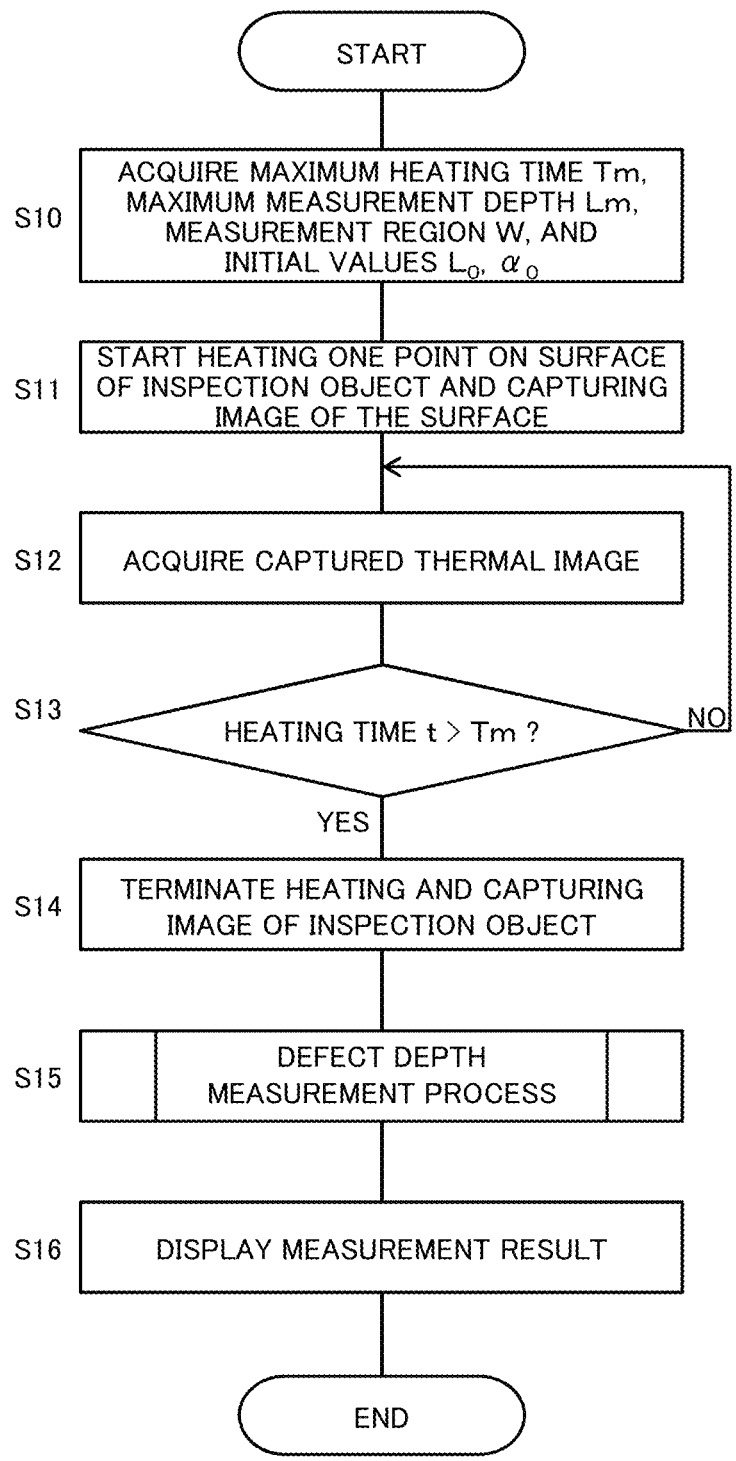
FIG. 5 is a flowchart illustrating a defect detection operation by the defect detection device according to the first embodiment.
Figure 6:
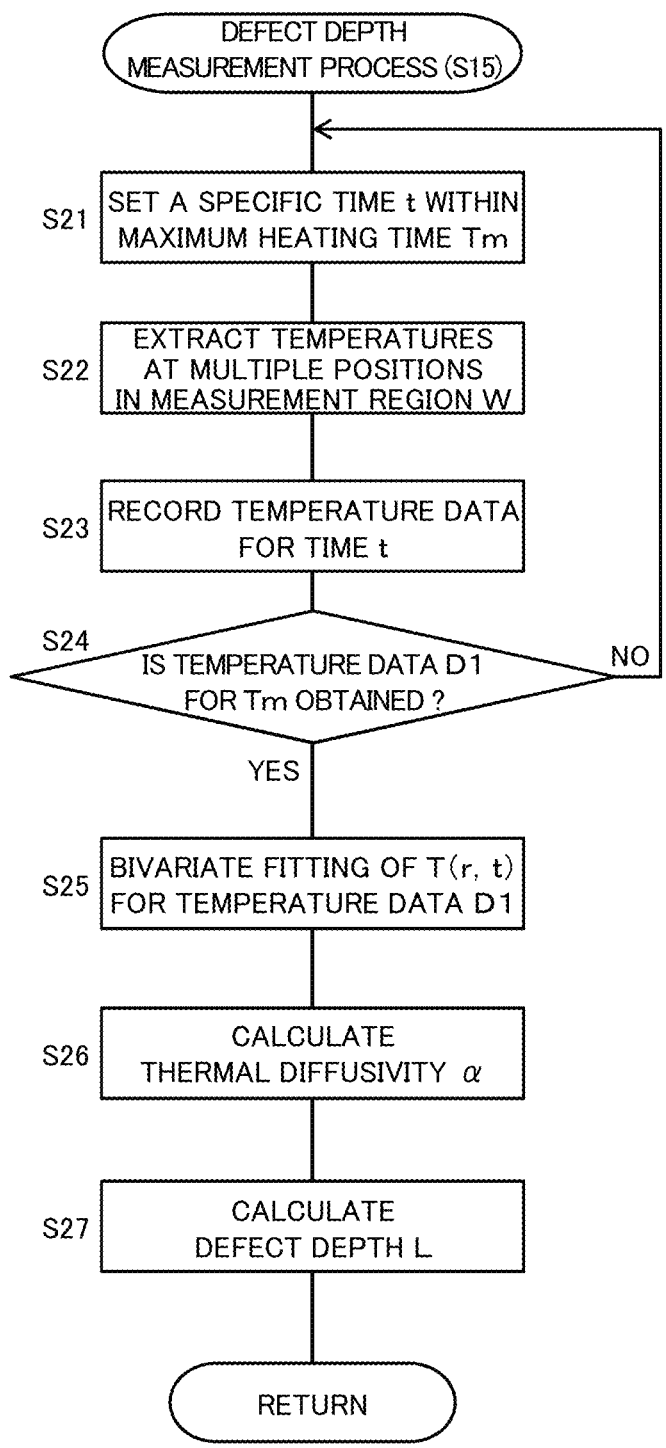
FIG. 6 is a flowchart illustrating a defect depth measurement process by a controller of the defect detection device according to the first embodiment.

As shown in FIG. 5, at first, the controller 35 acquires a maximum heating time Tm, a maximum measurement depth Lm, a measurement region W, and various initial values $L_0$, $\alpha_0$ as setting values (S10). These setting values are input by a user using the operation interface 37 and in advance stored in the memory 34.

The maximum measurement depth Lm is a maximum value of a depth to be measured in this defect detection and is set depending on a desired depth to which a defect is detected. For example, in the case of detecting a defect of a highway or the like, the outermost steel frame is present at 50 cm from the surface. Thus, it is required to detect whether a defect such as a separation or a void exists up to the depth of about 50 cm from the surface. In such a case, the maximum measurement depth Lm is set to 50 cm.

The maximum heating time Tm is set in relation to the maximum measurement depth Lm. For example, the maximum heating time Tm is set to a heating time so as to sufficiently make a difference between the surface temperature of the defective portion and the surface temperature of the sound portion at the maximum measurement depth Lm, at a position separated by a maximum distance rm from a heating position P0 heated in a dot shape on the surface of the inspection object (see FIG. 8).

Figure 8:
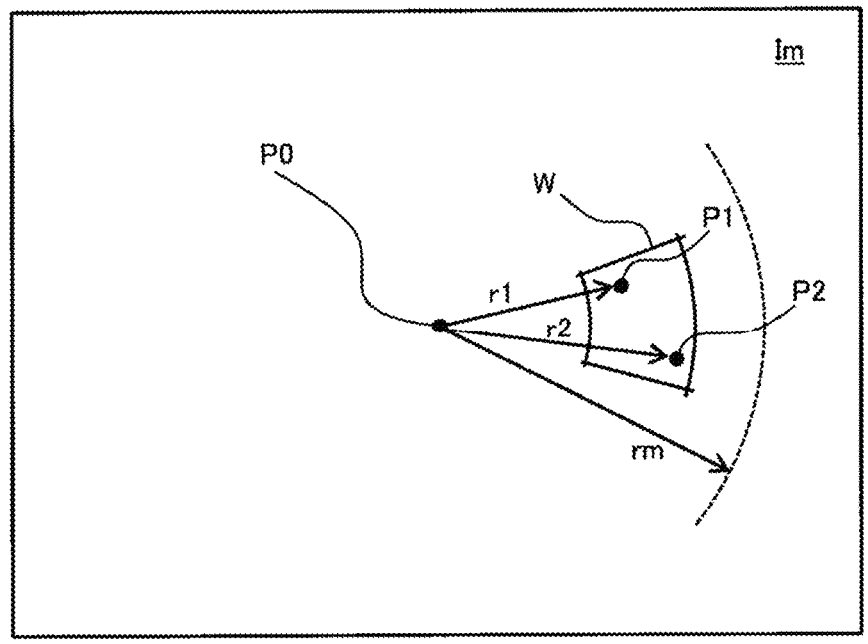
FIG. 8 is a diagram for explaining a position where the temperature is to be extracted in the defect detection system.

The measurement region W is a region for measurement performed in the image-capturing range of the infrared camera 20 (see FIG. 8). The measurement region W is set within a range of the maximum distance rm from the heating position P0. At step S10, the controller 35 may acquire the maximum distance rm and the heating position P0.

The initial values $L_0$, $\alpha_0$ are appropriately set in a predetermined range such as $L_0$<Lm, e.g., in the vicinities of the values assumed as the thickness L and the thermal diffusivity a, respectively, of the inspection object. As a result, the convergence accuracy of the fitting described later can be improved.

Figure 3:
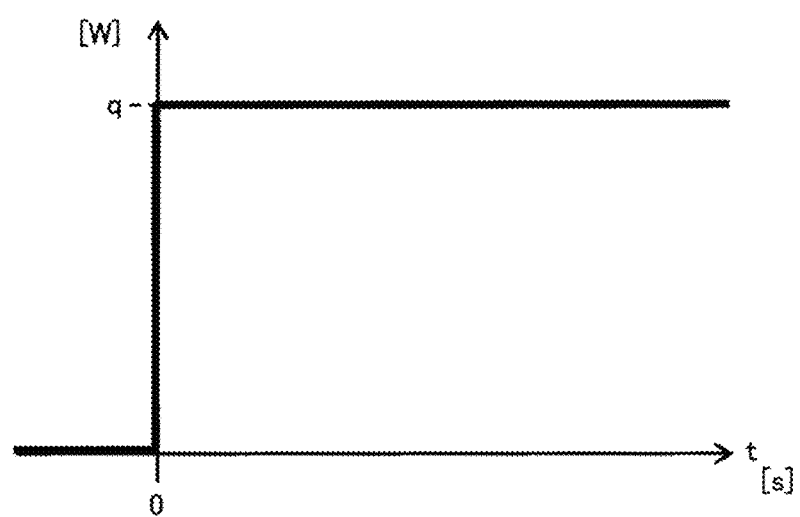
FIG. 3 is a graph showing a state of heating by the defect detection system

Subsequently, the controller 35 controls the laser driver 11 to open the shutter of the laser device 10 to start dot-shaped heating, i.e., point heating, for the specific heating position P0 on the surface of the inspection object in a step-like manner such that a supplied heat quantity q per hour becomes constant as shown in FIG. 3 (S11). Specifically, the heating is performed such that a heating input is achieved as a step input. Simultaneously with the start of heating of the inspection object, the controller 35 controls the infrared camera 20 to start capturing the image of the surface of the inspection object (S11).

T(r, t) of Eq. (1) is a function that is a theoretical solution of the heat conduction equation for the step response. Therefore, to actually measure the temperature data for fitting to this function, heating is started in a step-like manner. In this embodiment, the controller 35 in advance supplies electric power to the laser device 10 and controls the opening and closing of the shutter of the laser device 10 to start heating of the surface of the inspection object in a step-like manner.

The controller 35 then acquires thermal image data representing a thermal image corresponding to the surface temperature of the inspection object from the infrared camera 20 (S12). The acquired thermal image data is stored in the memory 34.

The controller 35 then determines whether a heating time t from the start of heating exceeds the maximum heating time Tm (S13). The controller 35 continues the acquisition of thermal image data (S12) until the heating time t exceeds the maximum heating time Tm. The processes of steps S12, S13 are repeated at predetermined time intervals, e.g. frame intervals of thermal images.

On the other hand, when the heating time t exceeds the maximum heating time Tm at step S13, the controller 35 controls the infrared camera 20, to terminate the image-capturing of the surface of the inspection object (S14). The controller 35 also controls the laser driver 11 to close the shutter of the laser device 10 and terminate the heating of the surface of the inspection object (S14). As a result, the thermal image data acquired during the maximum heating time Tm is accumulated in the memory 34.

The controller 35 then performs a defect depth measurement process (S15). This process will be described later.

The controller 35 then displays a measurement result of the defect depth on the display 36 (S16) and terminates the defect detection operation. The controller 35 may display information of the defect depth L as color information or gradation information on an image showing the surface of an inspection object, for example.

The defect depth measurement process of FIG. 5 will hereinafter be described with reference to FIGS. 6 to 9.

Figure 7:
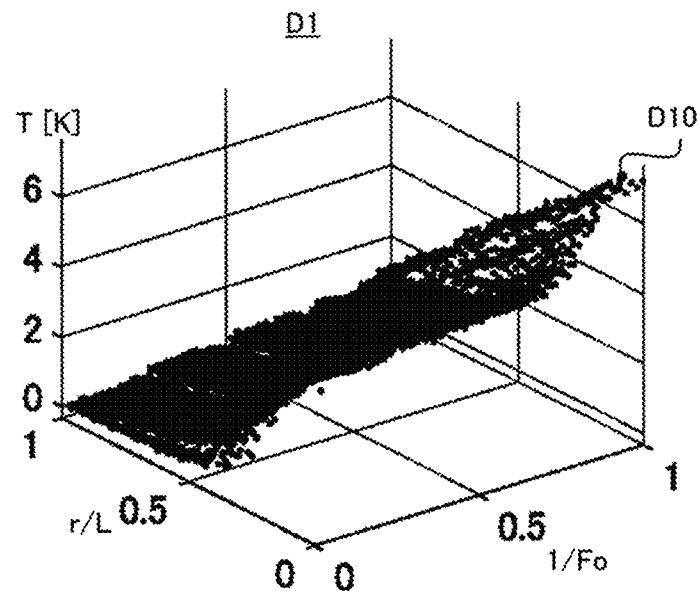
FIG. 7 is a diagram illustrating temperature data in a defect detection system.

At first, the controller 35 performs a process of acquiring temperature data D1 indicating temporal changes in temperature at multiple positions on the surface of the inspection object based on the thermal image data accumulated during the maximum heating time Tm (S21 to S24). FIG. 7 is a diagram illustrating the temperature data D1 in the system 1. For example, as shown in FIG. 7, the temperature data D1 includes multiple data points D10 at which the Fourier number Fo corresponding to the heating time t, the dimensionless distance r/L, and the (incremental) temperature T [K] are associated with each other.

For example, the controller 35 sets a specific time t within the maximum heating time Tm (S21) and extracts respective temperatures at multiple positions within the range of the measurement region W in the thermal image of the frame corresponding to the specific time t (S22). FIG. 8 illustrates positions that are temperature extraction objects.

FIG. 8 shows an example in which two positions P1, P2 in a thermal image Im are temperature extraction objects. The respective positions P1, P2 are within a range of the measurement region W and have distances r1, r2 from the heating position P0 where the point heat source is located. The distance r1 of one of the two positions P1, P2 and the distance r2 of the other position P2 are different from each other. The multiple positions P1 to P2 of the extraction objects are not particularly limited to two positions and may be set as all pixels in the measurement region W or may be set at predetermined intervals.

At step S22, the controller 35 may calculate an average value of temperature of multiple pixels when the temperature is extracted at one position. From the viewpoint of avoiding a temperature drift of the infrared camera 20, the controller 35 may subtract a temperature of a pixel at a position expected as background from a temperature of a pixel at a position of the extraction object in the thermal image Im so as to calculate a temperature of an extraction result.

The controller 35 then records the temperature data for the set time t in the memory 34, for example (S23). As the temperature data for the set time t, for example, the Fourier number 1/Fo corresponding to the same time t, the dimensionless distance r/L corresponding to the respective positions P1 to P2, and the temperature of the extraction result for each position are associated with each other.

For example, until the temperature data D1 for the maximum heating time Tm is obtained (S24), the controller 35 repeats the process subsequent to step S21 (NO at S24), at the time t defined in each predetermined time interval (referred to as "Δt"). For example, the time interval Δt is a frame interval of the thermal image Im or a multiple thereof. The time interval Δt in the temperature data D1 may not be constant and may be set to be relatively short in the vicinity of the start of heating and longer toward the end of heating, for example.

Figure 9:
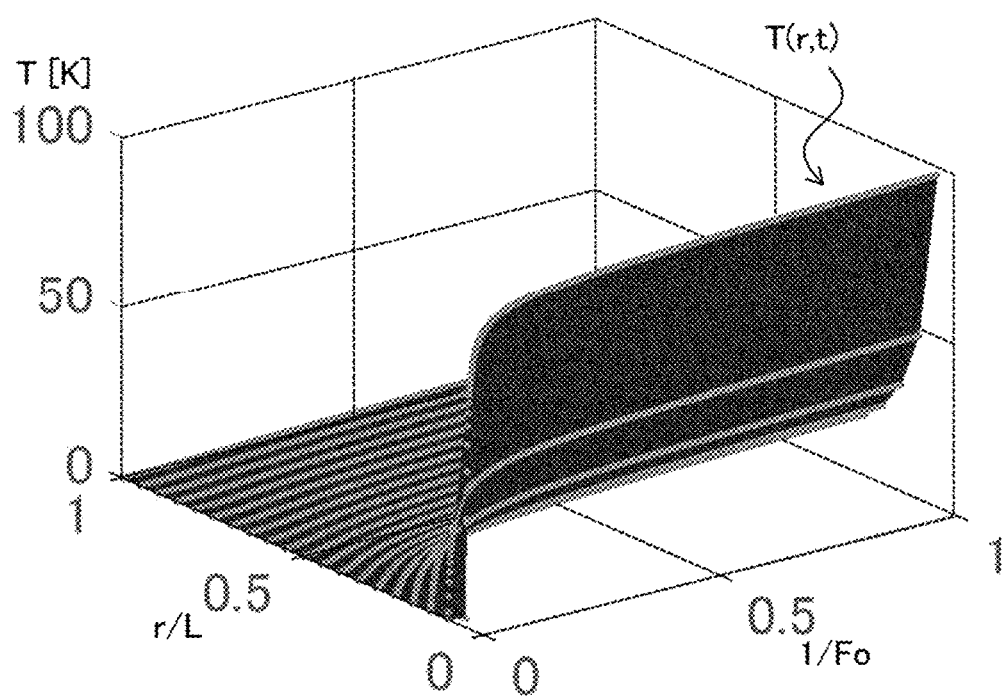
FIG. 9 is a diagram for explaining fitting by the defect detection system.

When the temperature data D1 is obtained (YES at S24), the controller 35 executes bivariate fitting of the function T(r, t) of Eq. (1) described above for the obtained temperature data D1 (S25). FIG. 9 illustrates T(r, t) according to the fitting of the system 1. In this case, the controller 35 changes the parameters A, B, C (Eqs. (2) to (4)) in Eq. (1) to perform the fitting so that the residual is minimized by using a nonlinear least squares method. The values of the parameters A, B, C are calculated by the fitting at step S25.

The controller 35 then calculates the thermal diffusivity a from Eq. (4) based on the value of the parameter C of the fitting result, for example (S26). The controller 35 calculates the defect depth L from Eq. (3) based on the value of the parameter B of the fitting result, for example (S27).

After the defect depth L is obtained (S27), the controller 35 terminates the process of step S15 of FIG. 5 and goes to step S16.

According to the defect depth measurement process (FIG. 6), both the thermal diffusivity a and the defect depth (or thickness) L of the inspection object can be obtained (S25, S26) from the acquired temperature data D1 by the bivariate fitting of T(r, t) of Eq. (1) (S24). The order of the processes of steps S26, S27 is not particularly limited, and the processes may be executed at the same time. Step S26 may be omitted as appropriate.

At steps S21 to S24 described above, an example of acquiring the temperature data D1 for the maximum heating time Tm has been described. Steps S21 to S24 are not limited thereto, and the temperature data D1 for a predetermined period T1 shorter than the maximum heating time Tm may be acquired. Also in this case, the same bivariate fitting as step S25 can be performed, taking into account the range of the predetermined period T1 for the heating start time t=0.

In the above description of the defect detection operation (FIG. 5), when the one heating position P0 is point-heated on the surface of the inspection object by the laser device 10, the defect depth L is measured in the one measurement region W in the described example; however, the defect detection operation of the system 1 is not limited thereto. For example, the defect detection device 30 of the system 1 may measure the defect depth L in multiple measurement regions W for the one heating position P0.

The system 1 may perform point heating by using multiple positions on the surface of the inspection object as heating positions to measure the defect depth L for each of the heating positions. For example, the controller 35 of the defect detection device 30 may measure the defect depth L such that multiple heating positions are scanned by repeating the flowchart of FIG. 5 at predetermined time intervals. Alternatively, the point heating at multiple heating positions may be performed at the same time by using multiple laser devices 10, for example. For example, by making the distance interval between the multiple heating positions larger than the maximum distance rm, the defect depth L can be measured while influences of different point heat sources are suppressed.

[1-2-3. Numerical Simulation]

The defect detection method described above can be applied even when an influence of heat transfer in the inspection object and an influence of a size of laser diameter exist to some degree. By using a numerical simulation, the present inventor verified the effect that the defect depth L can accurately be measured by fitting of T(r, t) according to the equation (1) even with the influences as described above. The numerical simulation performed by the present inventor will hereinafter be described with reference to FIGS. 10A to 16B.

Figure 10A:
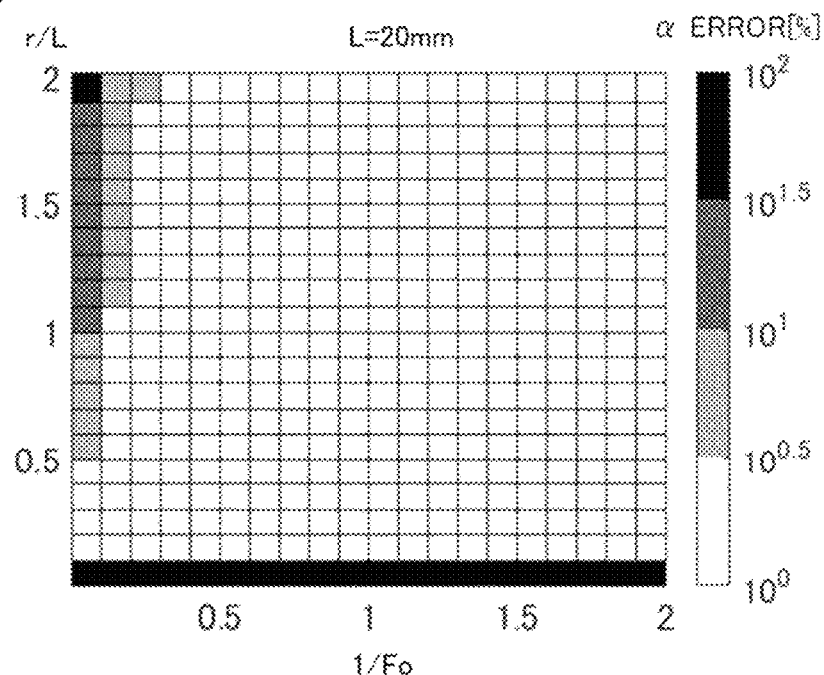
FIG. 10A is a diagram showing a calculation result of thermal diffusivity from a simulation in an ideal case.
Figure 10B:
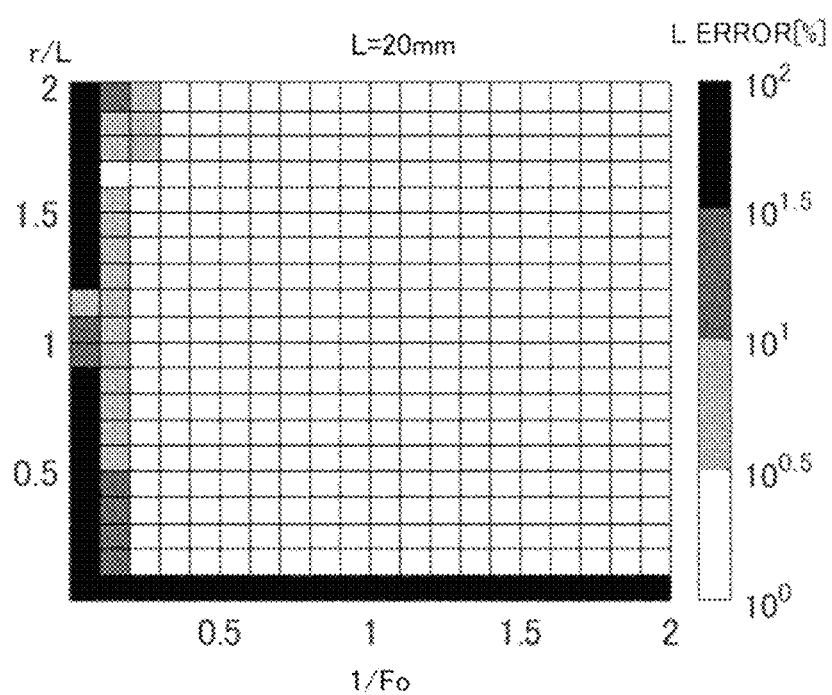
FIG. 10B is a diagram showing a calculation result of thickness from the simulation of FIG. 10A.

FIG. 10A shows a calculation result of the thermal diffusivity a from a simulation in an ideal case. FIG. 10B shows a calculation result of the thickness L from the same simulation as FIG. 10A.

In FIGS. 10A and 10B, simulation was performed for that case that the inspection object 100 (FIG. 2) is adiabatic and the point heat source 110 is exactly a point (within an error range of a mesh). In this case, k=1.6 W/mK, q=1 W, L=20 mm, and $\alpha=1\times10^{-6}$ m$^2$/s were set. For the temperature data of the simulation results, the same bivariate fitting as S25 of FIG. 6 was performed for each data section of a rectangular region shown in FIGS. 10A and 10B to calculate the thermal diffusion a and the thickness L (S26, S27). FIGS. 10A and 10B show errors of the calculated heat diffusion a and thickness L for each data section (the same applies to FIGS. 11A to 16B).

According to FIGS. 10A and 10B, the heat diffusion a and the thickness L can accurately be calculated in most of the data sections by the bivariate fitting of T(r, t) corresponding to the point heating. The data section of r/L=0 to 0.1 is considered as an error due to the mesh size in the numerical simulation.

Figure 11A:
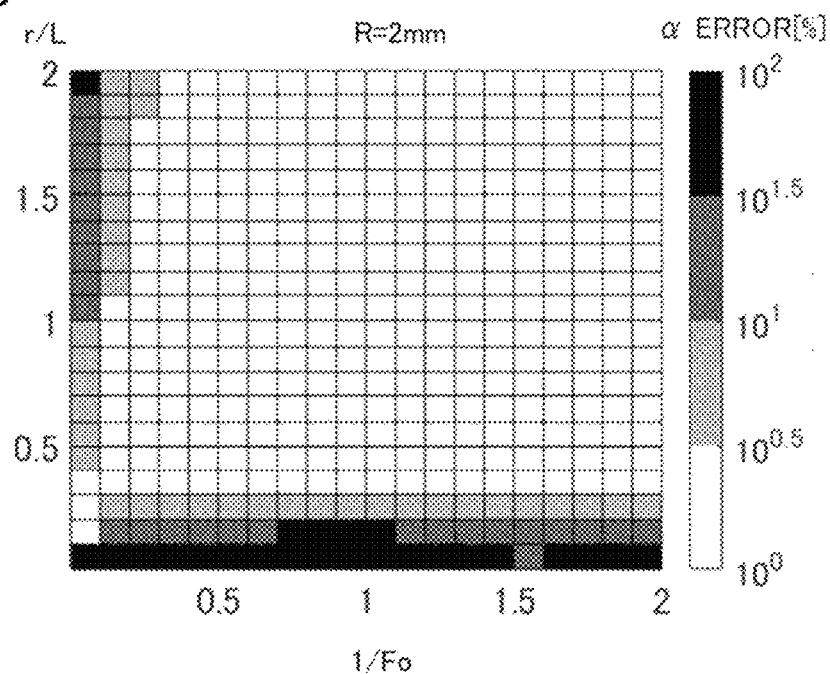
FIG. 11A is a diagram showing a calculation result of thermal diffusivity from simulation with an influence of a laser diameter taken into consideration.
Figure 11B:
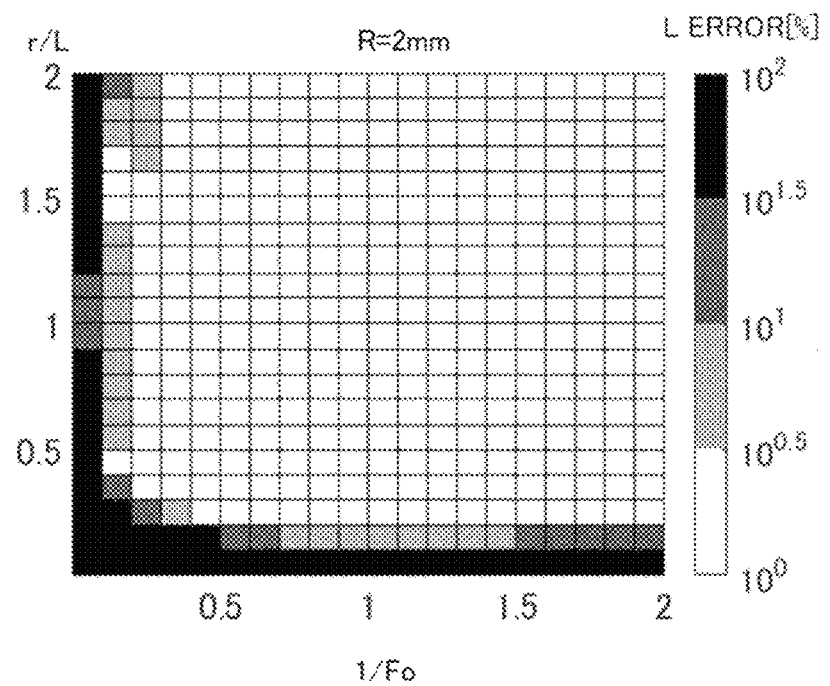
FIG. 11B is a diagram showing a calculation result of thickness from the simulation of FIG. 11A.

FIGS. 11A and 11B show respective calculation results of the thermal diffusivity a and the thickness L from simulation with an influence of a laser diameter taken into consideration with respect to the ideal case described above. In FIGS. 11A and 11B, simulation was performed for the case that the diameter R of the point heat source 110 is 2 mm in accordance with the size of the laser diameter, and the bivariate fitting of T(r, t) (Eq. (1)) as performed for the simulation results.

According to FIGS. 11A and 11B, although the error is larger than the case of FIGS. 10A and 10B only at r/L=0.1 to 0.2, the thermal diffusivity a and the thickness L are calculated with sufficiently good accuracy. Therefore, in this case, it was verified that the theoretical solution T(r, t) corresponding to the point heating is theoretically applicable even when the point heat source 110 has a finite size in actual measurement.

Figure 12A:
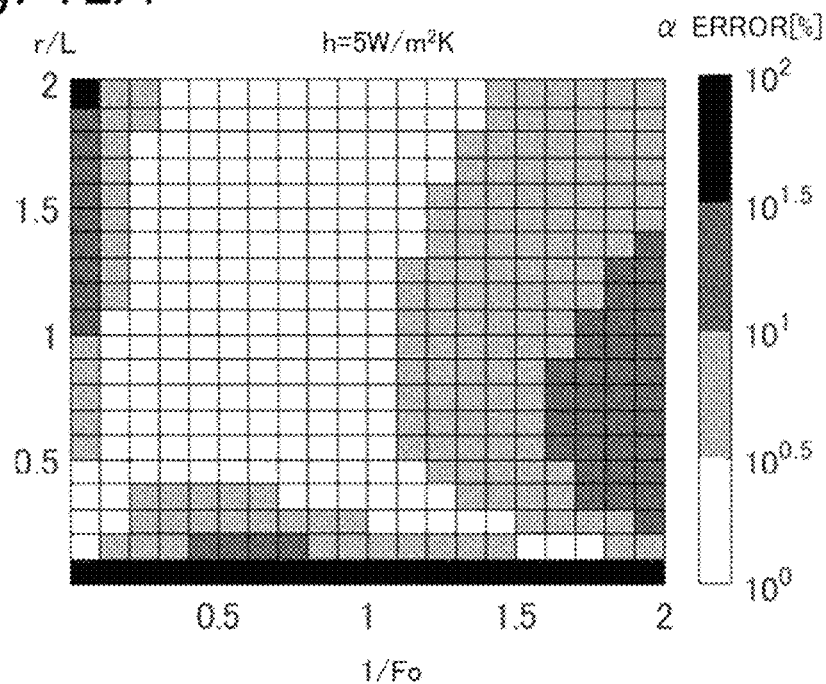
FIG. 12A is a diagram showing a calculation result of thermal diffusivity from simulation with an influence of heat transfer taken into consideration.
Figure 12B:
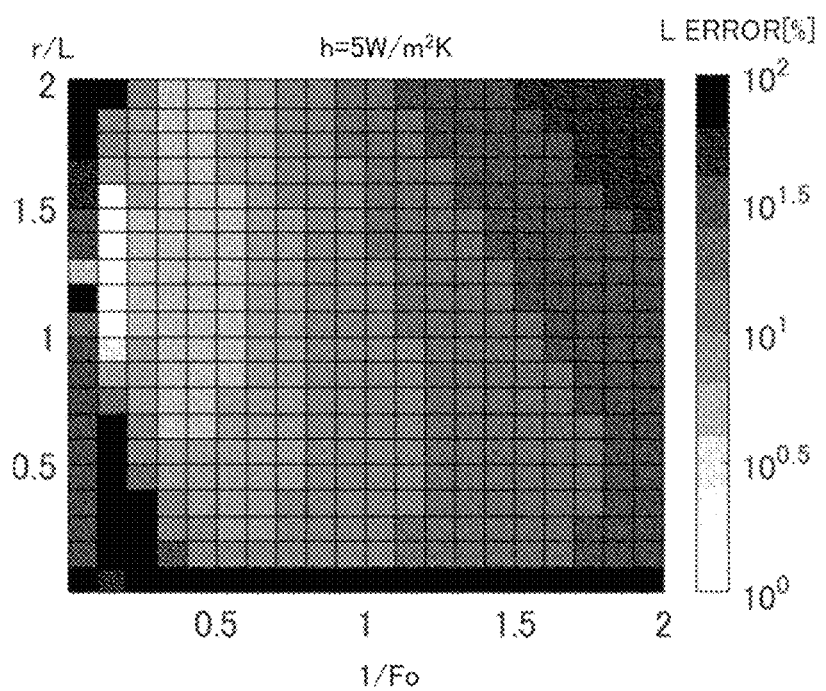
FIG. 12B is a diagram showing a calculation result of thickness from the simulation of FIG. 12A.

FIGS. 12A and 12B show the respective calculation results of the thermal diffusivity a and the thickness L from simulation with an influence of heat transfer taken into consideration with respect to the ideal case described above. In FIGS. 12A and 12B, the heat transfer coefficient=5 W/(m$^2$·K) was set for the heat transfer between the front surface 101 of the inspection object 100 and the outside air, and the same simulation as described above was performed.

According to FIGS. 12A and 12B, it can be seen that as the heating time becomes longer, the errors of the thermal diffusivity a and the thickness L increase due to an influence of the heat transfer. On the other hand, sufficient accuracy is ensured in the data section near Fo=0.5. Therefore, in this case, it was verified that the thermal diffusivity a and the thickness L can accurately be calculated by performing the fitting including the data section as described above.

The influences of laser diameter and heat transfer as described above can be organized by using the dimensionless diameter R/L and the Biot number Bi=hL/k. For example, in the case of FIGS. 11A and 11B, R/L=1/10 and Bi=0 are satisfied, and in the case of FIGS. 12A and 12B, R/L=0 and Bi=1/16 are satisfied.

Figure 13A:
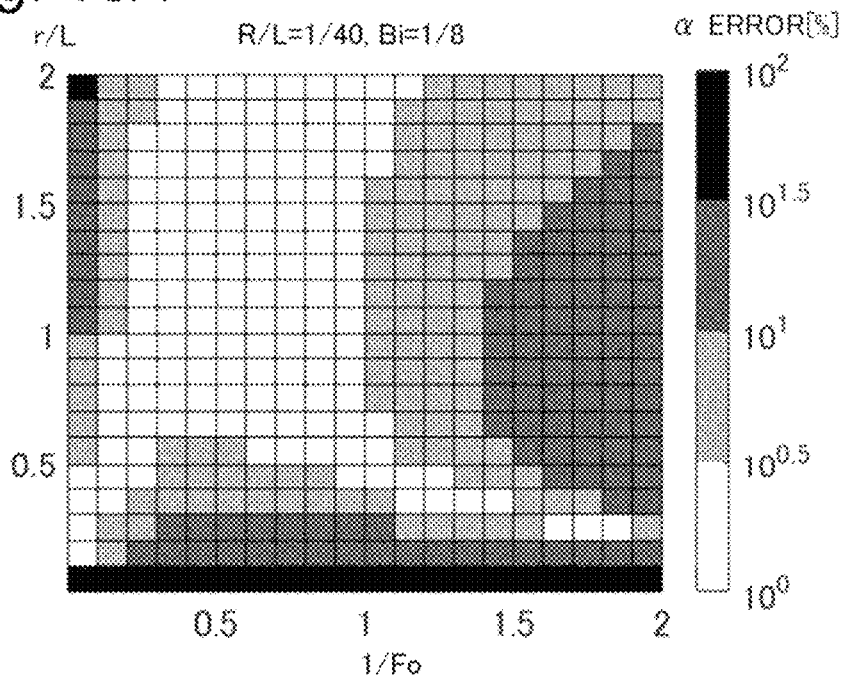
FIG. 13A is a diagram showing a calculation result of thermal diffusivity from simulation in the case of R/L=1/40 and Bi=1/8.
Figure 13B:
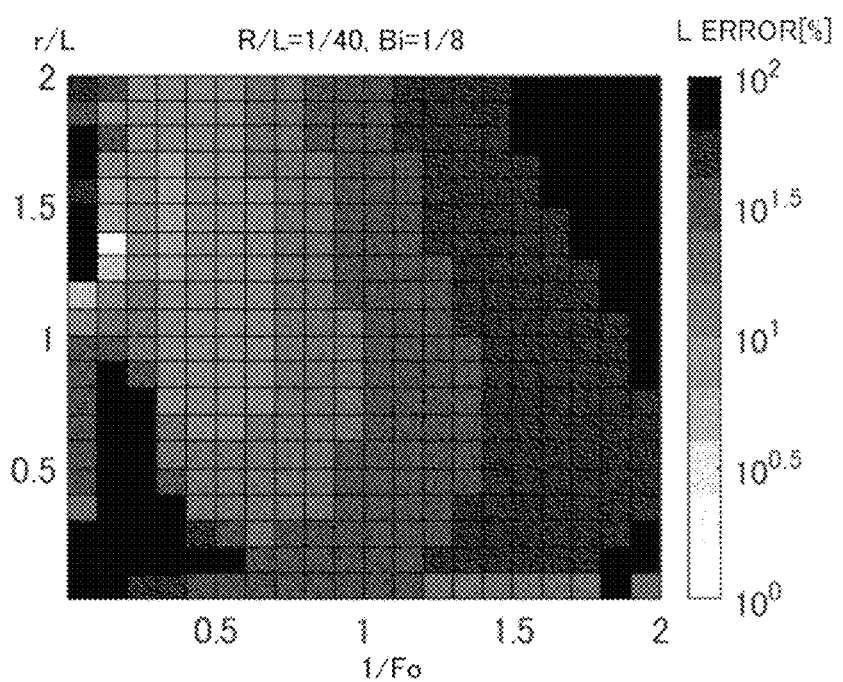
FIG. 13B is a diagram showing a calculation result of thickness from the simulation of FIG. 13A.
Figure 14A:
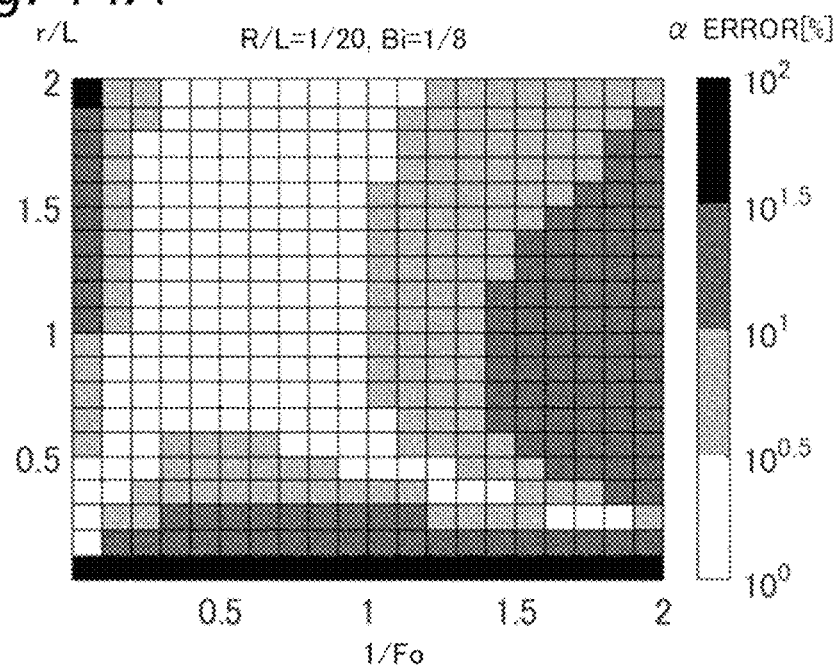
FIG. 14A is a diagram showing a calculation result of thermal diffusivity from simulation in the case of R/L=1/20 and Bi=1/8.
Figure 14B:
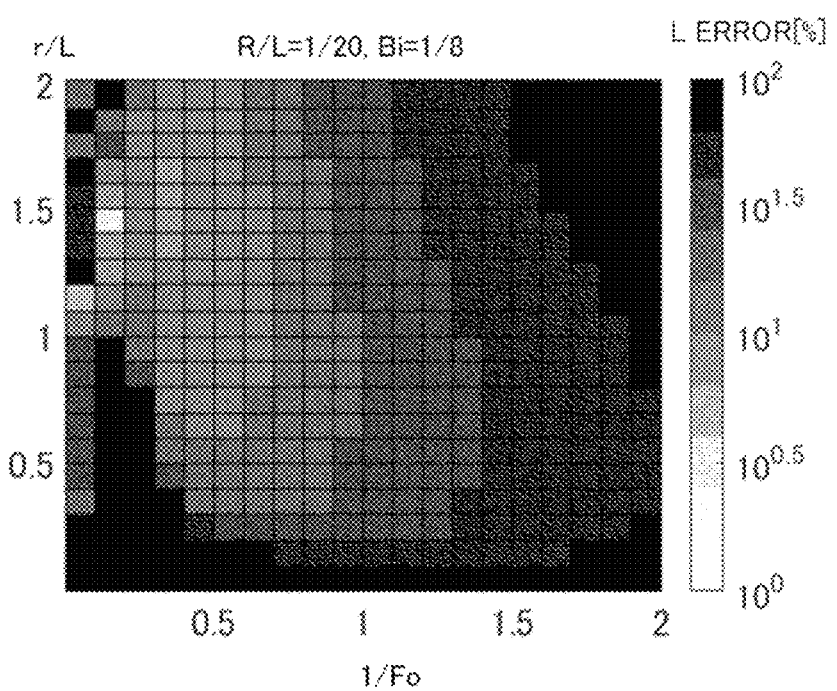
FIG. 14B is a diagram showing a calculation result of thickness from the simulation of FIG. 14A.
Figure 15A:
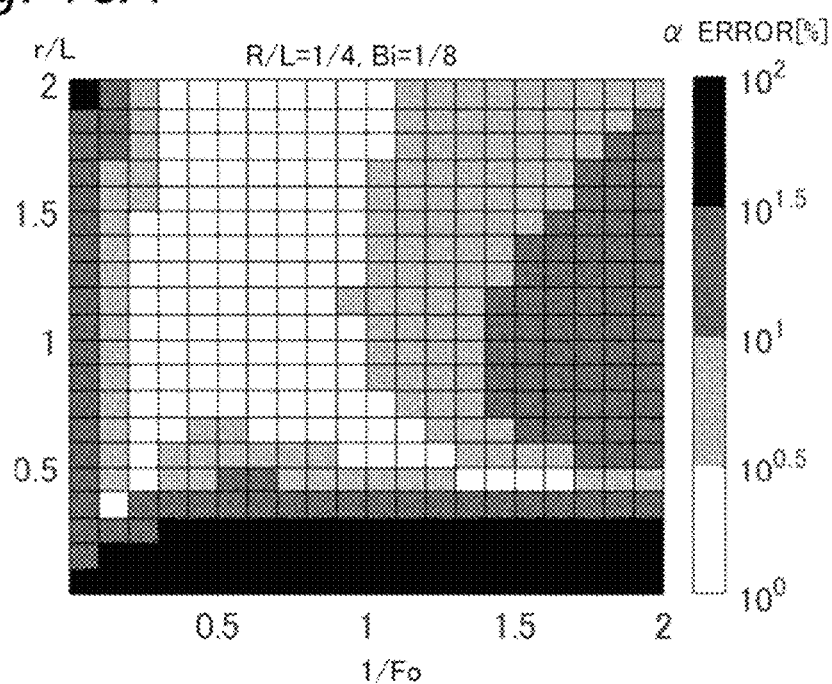
FIG. 15A is a diagram showing a calculation result of thermal diffusivity from simulation in the case of R/L=1/4 and Bi=1/8.
Figure 15B:
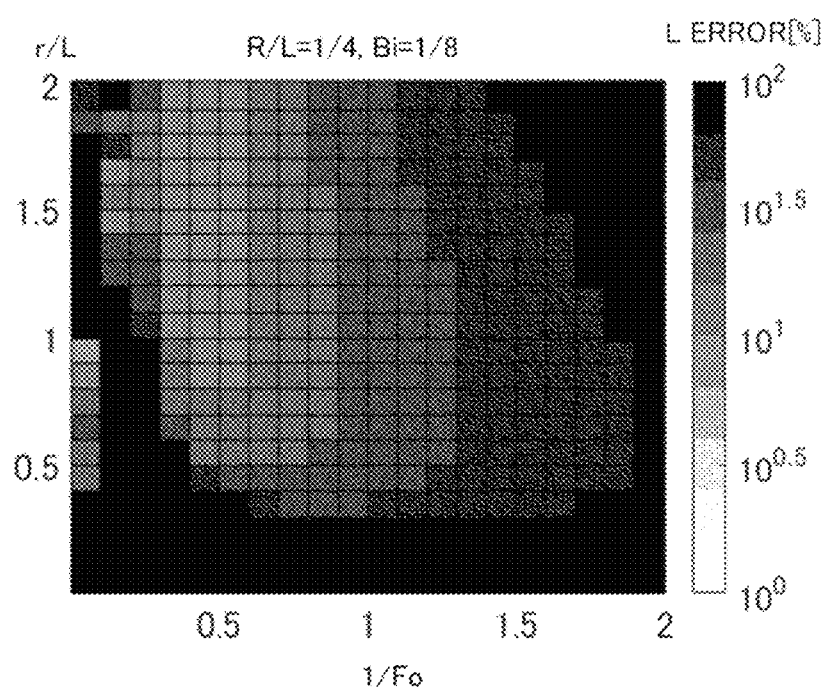
FIG. 15B is a diagram showing a calculation result of thickness from the simulation of FIG. 15A.
Figure 16A:
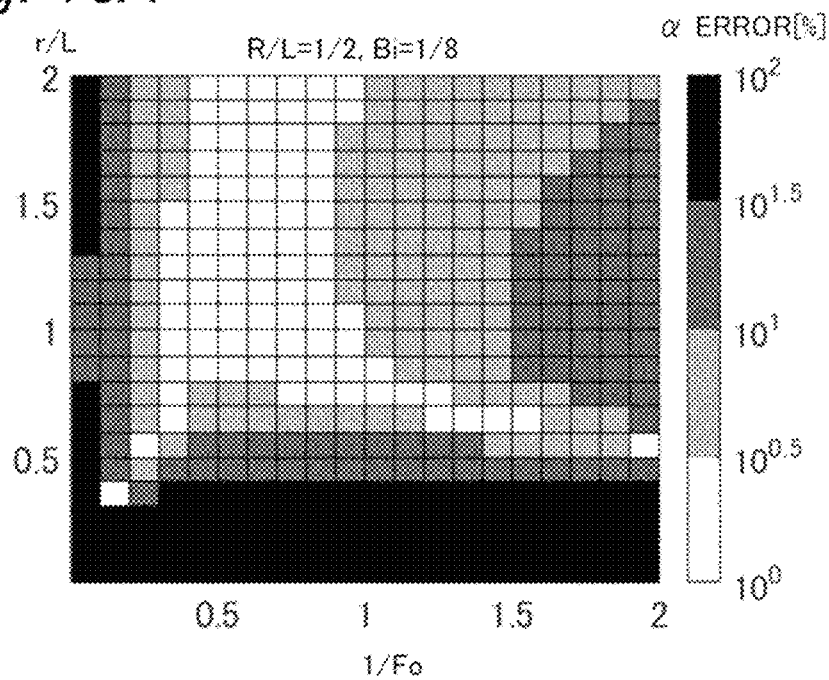
FIG. 16A is a diagram showing a calculation result of thermal diffusivity from simulation in the case of R/L=1/2 and Bi=1/8.
Figure 16B:
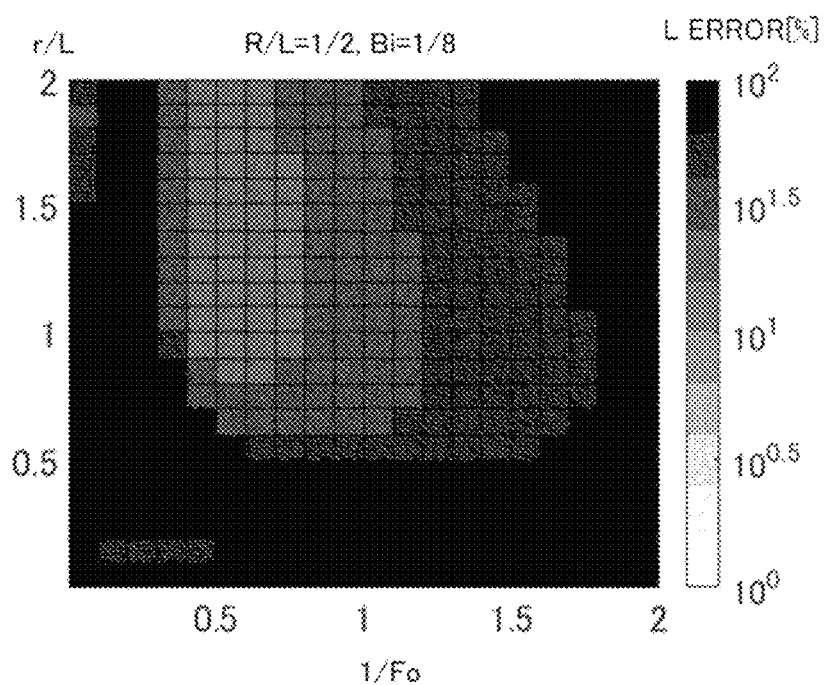
FIG. 16B is a diagram showing a calculation result of thickness from the simulation of FIG. 16A.

FIGS. 13A and 13B show the respective calculation results of the thermal diffusivity a and the thickness L from simulation in the case of R/L=1/40 and Bi=1/8. Similarly, FIGS. 14A to 16B show the respective calculation results of the thermal diffusivity a and the thickness L in the cases of R/L=1/20 and Bi=1/8, R/L=1/4 and Bi=1/8, and R/L=1/2 and Bi=1/8.

According to FIGS. 13A to 16B, it was verified that the thermal diffusivity a and the thickness L can accurately be calculated by appropriately setting the data sections of the fitting even in the case of R/L=1/2, for example.

[1-3. Effects]

As described above, in this embodiment, the defect detection method is a method of measuring a depth L of a defect inside an inspection object. This method includes: a step S11 of heating a surface of the inspection object in a dot shape by the laser device (heating device) 10; a step S12 of generating a thermal image Im corresponding to a temperature of the surface of the inspection object by capturing an image of the heated surface of the inspection object at predetermined time intervals by the infrared camera (imaging device) 20; steps S21 to S24 of acquiring the temperature data D1 indicating temporal changes in surface temperature at multiple positions P1 to P2 on the inspection object based on the thermal image Im; step S25 of fitting T(r, t) that is a function indicating the solution of the heat conduction equation corresponding to the point heat source and including the parameters A, B, C related to the depth of the defect of the inspection object to the temperature data D1; and step S26 of calculating the depth L of the defect of the inspection object based on the values of the parameters included in the fitted T(r, t).

In this embodiment, the defect detection device 30 measures a depth of a defect inside an inspection object. The defect detection device 30 includes the first communication interface (input interface) 31 and the controller (processor) 35. The first communication interface 31 inputs thermal image data generated by capturing an image of a heated surface of the inspection object at the maximum heating time interval (predetermined time interval) Tm. The controller 35 performs an arithmetic operation to obtain the depth of the defect of the inspection object based on the thermal image data. The controller 35 acquires temperature data indicating temporal changes in temperature at multiple positions on the surface of the inspection object, performs fitting of a solution function indicating the solution of the heat conduction equation according to a point heat source and including the parameters related to the depth of the defect of the inspection object to the temperature data, and calculates the depth of the defect of the inspection object based on the values of the parameters included in the fitted solution function.

In this embodiment, the defect detection system 1 is a system measuring a depth of a defect inside an inspection object. The defect detection system 1 includes the laser device (heating device) 10, the infrared camera (imaging device) 20, and the defect detection device 30 described above. The laser device 10 heats the surface of the inspection object in a dot shape. The infrared camera 20 captures the image of the heated surface of the inspection object and generates a thermal image corresponding to the temperature of the surface of the inspection object. The defect detection device 30 measures a depth of a defect inside the inspection object based on the thermal image.

As a result, the defect depth can be obtained by using the thermal image data during heating in accordance with the theoretical equation at the time of step response of Eq. (1) obtained from the heat conduction equation. In this case, by fitting of T(r, t) using the temperature data D1 of multiple positions different in the distance r depending on the point heating, the defect depth L can be calculated even when the thermal diffusivity a of the inspection object is unknown. Therefore, the defect depth L of the inspection object can accurately be measured.

In this embodiment, the solution function T(r, t) has the first argument r (or r/L) corresponding to the distance r from the heated position P0 on the surface of the inspection object and the second argument t (or Fo) corresponding to the heated time t. The defect detection method further includes step S27 of calculating the thermal diffusivity a of the inspection object based on the values of the parameters included in T(r, t) fitted over the first and second arguments r, t. As a result, the thermal diffusivity a can be obtained at the same time as the defect depth L of the inspection object.

In this embodiment, the temperature data D1 includes temporal changes in temperature at multiple positions P1, P2 at different distances r from the heated position P0 on the surface. The fitting of T(r, t) can accurately be performed by using the temperature data D1 indicating the temperature change at the different distances r1, r2.

In this embodiment, in the defect detection method, the heating of the surface of the inspection object by the laser device 10 is started in a step-like manner, and the infrared camera 20 starts capturing the image of the surface of the inspection object simultaneously with the start of heating of the inspection object to start the generation of the thermal image (S11). T(r, t) is based on the step response. By obtaining the thermal image synchronized with the start of step-like heating, the fitting of T(r, t) based on the step response can accurately be performed.

In this embodiment, T(r, t) includes at least three independent parameters A, B, C. T(r, t) is represented by Eq. (1) described above. In Eq. (1), T(r, t) is the temperature [K] of the surface of the inspection object; r is the distance [m] from the heated position on the surface; $L_0$ is the initial value of the thickness [m]; L is the thickness [m] of the inspection object; t is the time [s]; Fo is the Fourier number; and A, B, and C are respective parameters. The three parameters A, B, and C are represented by Eqs. (2), (3), and (4), respectively. In Eqs. (2) to (4), q is the heat quantity [W] per unit time; k is the thermal conductivity [W/(m·K)] of the inspection object; $\alpha$ is the thermal diffusivity [m²/s] of the inspection object; and $\alpha_0$ is the initial value of the thermal diffusivity [m²/s]. The parameters A, B, and C are obtained by using a nonlinear least squares method to perform fitting such that a residual is minimized.

OTHER EMBODIMENTS

The first embodiment has been described above as exemplification of the techniques disclosed in this application. However, the techniques of this disclosure are not limited thereto and are applicable to embodiments with modification, replacement, addition, omission, or the like made as appropriate. The constituent elements described in the first embodiment can be combined to form a new embodiment. Therefore, other embodiments will hereinafter exemplarily be described.

In the first embodiment described above, a method and a device for measuring a depth of a defect inside an inspection object have been described. The idea of the present disclosure is applicable not only to the measurement of the depth of the defect inside the inspection object but also to a method and a device for measuring a thickness of a measurement object. In the first to sixth embodiments, a distance from an inspection object surface to an internal defect (cavity, separation) is obtained as the depth of the defect. Measuring the distance from the inspection object surface to the internal cavity or separation is the same as measuring the thickness of the measurement object. Therefore, the method of measuring a defect depth of an inspection object described in the first embodiment is obviously applicable to the method of measuring a thickness of a measurement object.

In other words, when the front surface of the measurement object is heated by the heating device such as the laser device 10, heat reflection occurs on the back surface of the measurement object, so that a temporal change in temperature of the front surface of the measurement object differs depending on the thickness of the measurement object. Therefore, also in thickness measurement, when the image of the surface of the measurement object is captured by an imaging device such as an infrared camera while the surface of the inspection object is heated by the heating device, the thickness can be measured based on the same idea as the defect detection method of the first embodiment. In this case, in the description of the first embodiment, the terms "defect detection device", "defect detection system", "inspection object", "defect depth", "defect detection operation, defect depth measurement operation", and "maximum measurement depth" may be replaced with "thickness measurement device", "thickness measurement system", "measurement object", "thickness", "thickness measurement operation", and "maximum measurement thickness", respectively.

In each of the embodiments, the laser device 10 has been described as an example of the heating device; however, the heating device is not limited to the laser device 10. The heating device according to this embodiment may be various light source devices including, for example, an optical system collecting light to implement dot-shaped heating by application of the collected light. Furthermore, the heating device in this embodiment is not limited to the light source device and may be various devices heating the surface of the object in a dot shape by various methods.

The embodiments have been described as exemplifications of the techniques in this disclosure. For this purpose, the accompanying drawings and the detailed description are provided. Therefore, the constituent elements described in the accompanying drawings and the detailed description may include not only the constituent elements essential for solving the problem but also constituent elements not essential for solving the problem for the purpose of illustrating the techniques. Therefore, even though those non-essential constituent elements are described in the accompanying drawings and the detailed description, these non-essential constituent elements should not immediately be recognized as being essential. Since the embodiments described above are intended to illustrate the techniques of this disclosure, various modifications, replacements, additions, omissions, or the like can be made within the claims and the scope equivalent thereto.

INDUSTRIAL APPLICABILITY

The present disclosure is applicable to a thickness measurement method, a thickness measurement device, and a thickness measurement system for measuring a thickness of a measurement object. The present disclosure is also applicable to a defect detection method, a defect detection device, and a defect detection system for measuring a depth of a defect such as a separation or a cavity inside an inspection object.

The invention claimed is:

1. A thickness measurement method of measuring a thickness of a measurement object, comprising:
   performing a heating operation by a heating device such that a surface of the measurement object is locally heated in a dot shape having a heated position as a center of the dot shape;
   generating thermal images corresponding to a temperature of the surface of the measurement object by capturing an image of the heated surface of the measurement object at a predetermined time interval by an imaging device, the image comprising multiple positions, each having a distance r from the heated position on the surface;
   acquiring temperature data indicating temporal changes in temperature at the multiple positions on the surface of the measurement object based on the thermal images generated by the imaging device;
   fitting a solution function to the temperature data for each of the multiple positions, the solution function indicating a solution of a heat conduction equation corresponding to a point heat source and including a parameter, which is a constant in the solution function and related to the thickness of the measurement object; and
   calculating the thickness of the measurement object based on a value of the parameter included in the fitted solution function obtained by the fitting.

2. The thickness measurement method according to claim 1, wherein:
   the solution function has a first argument corresponding to the distance from the heated position on the surface for each of the multiple positions and a second argument corresponding to a heated time, and
   the method further comprises calculating a thermal diffusivity of the measurement object based on the value of the parameter included in the solution function fitted over the first and second arguments.

3. The thickness measurement method according to claim 1, wherein
   the multiple positions includes at least two positions having different distances from the heated position on the surface from each other.

4. The thickness measurement method according to claim 1, wherein:
   the heating device starts heating the surface of the measurement object in a step-like manner, and
   simultaneously with the start of heating of the measurement object, the imaging device starts capturing the image of the surface of the measurement object to start generation of the thermal images.

5. The thickness measurement method according to claim 1, wherein
   the solution function includes at least three independent parameters.

6. The thickness measurement method according to claim 5, wherein
   the solution function is represented by Eq. (1):

[Mathematical 1]

$$T(r, t) = A \sum_{n=-\infty}^{\infty} \frac{1}{\sqrt{\left(\frac{r}{L_0}\right)^2 + 4n^2 B^2}} \exp\left(\frac{1}{2}\sqrt{CF_o}\sqrt{\left(\frac{r}{L_0}\right)^2 + 4n^2 B^2}\right) \quad (1)$$

where $T(r, t)$ is a temperature [K] of the surface of the measurement object; $r$ is a distance [m] from the heated position on the surface; $L_0$ is an initial value of the thickness [m]; $L$ is the thickness [m] of the inspection object; $t$ is a time [s]; $Fo$ is the Fourier number; and A, B, and C are the respective parameters, and wherein the three independent parameters A, B, and C are represented by Eqs. (2), (3), and (4), respectively:

[Mathematical 2]

$$A = \frac{q}{2\pi k L_0} \quad (2)$$

$$B = \frac{L}{L_0} \quad (3)$$

$$C = \frac{\alpha_0}{\alpha} \quad (4)$$

where q is a heat quantity [W] per unit time; k is a thermal conductivity [W/(m·K)] of the measurement object; a is a thermal diffusivity [m²/s] of the measurement object; and $\alpha_0$ is an initial value of the thermal diffusivity [m₂/s].

7. The thickness measurement method according to claim 1, wherein
the parameter is obtained by using a nonlinear least-squares method to perform the fitting.

8. A thickness measurement device configured to measure a thickness of a measurement object, comprising:
an input interface configured to receive thermal images, each generated by capturing an image of a heated surface of the measurement object at a predetermined time interval, each of the thermal images being obtained by performing a heating operation by a heating device such that a surface of the measurement object is locally heated in a dot shape having a heating position as a center of the dot shape, and comprising multiple positions, each having a distance r from the heated position on the surface; and
a processor configured to perform a calculation for obtaining a thickness of the measurement object based on the thermal images, wherein
the processor is configured to:
acquire temperature data indicating temporal changes in temperature at multiple positions on the surface of the measurement object based on the thermal images;
fit a solution function to the temperature data for each of the multiple positions, the solution function indicating a solution of a heat conduction equation corresponding to a point heat source and including a parameter, which is a constant in the solution function and related to the thickness of the measurement object; and
calculate the thickness of the measurement object based on a value of the parameter included in the fitted solution function obtained by the fitting.

9. A thickness measurement system for measuring a thickness of a measurement object, comprising:
the heating device configured to locally heat, in the dot shape, the surface of the measurement object;
an imaging device configured to generate the thermal images image corresponding to a temperature of the surface of the measurement object by capturing an image of the heated surface of the measurement object; and
the thickness measurement device according to claim 8, configured to measure the thickness of the measurement object based on the thermal images.

10. A defect detection device configured to measure a depth of a defect inside an inspection object, comprising:
an input interface configured to receive thermal images, each generated by capturing an image of a heated surface of the inspection object at a predetermined time interval, each of the thermal images being obtained by performing a heating operation by a heating device such that a surface of the measurement object is locally heated in a dot shape having a heating position as a center of the dot shape, and comprising multiple positions, each having a distance r from the heated position on the surface;
a processor configured to perform a calculation for obtaining the depth of the defect of the inspection object based on the thermal images, wherein
the processor is configured to:
acquire temperature data indicating temporal changes in temperature at multiple positions on the surface of the inspection object based on the thermal images;
fit a solution function to the temperature data for each of the multiple positions, the solution function indicating a solution of a heat conduction equation corresponding to a point heat source and including a parameter, which is a constant in the solution function and related to the depth of the defect of the inspection object; and
calculate the depth of the defect of the inspection object based on a value of the parameter included in the fitted solution function obtained by the fitting.

11. A defect detection system for measuring a depth of a defect inside an inspection object, comprising:
the heating device configured to locally heat, in the dot shape, the surface of the inspection object;
an imaging device configured to generate the thermal images; and
the defect detection device according to claim 10, configured to measure the depth of the defect inside the inspection object based on the thermal images.

* * * * *